No. 732,538. PATENTED JUNE 30, 1903.
W. H. FULCHER.
DREDGER.
APPLICATION FILED SEPT. 4, 1902.
NO MODEL. 2 SHEETS—SHEET 1.

Witnesses,
Dudley Moss.

Inventor,
William H. Fulcher
By Dewey Strong & Co.

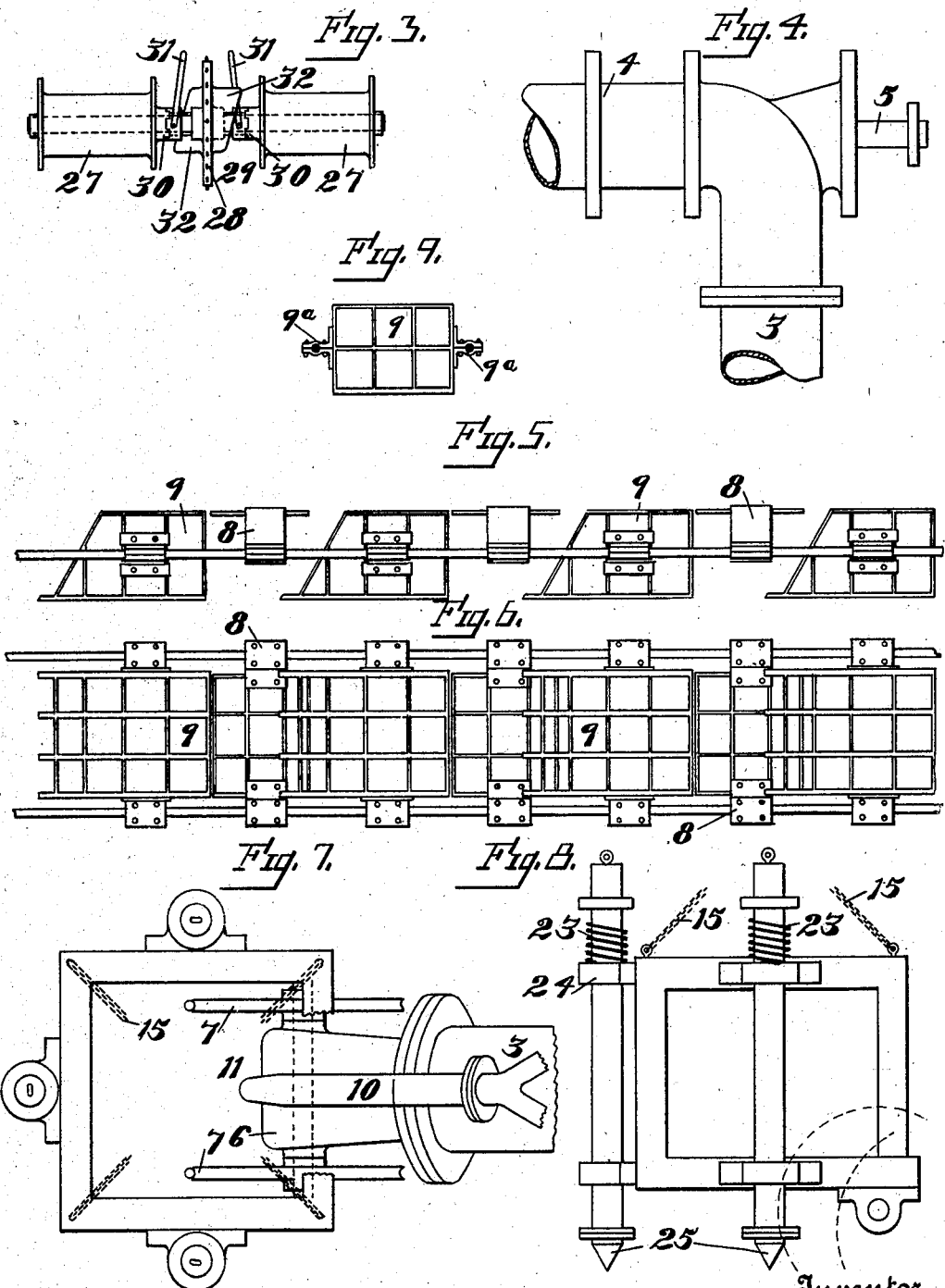

No. 732,538. Patented June 30, 1903.

UNITED STATES PATENT OFFICE.

WILLIAM H. FULCHER, OF OAKLAND, CALIFORNIA, ASSIGNOR OF ONE-HALF TO HERMAN MURPHY, OF SAN FRANCISCO, CALIFORNIA.

DREDGER.

SPECIFICATION forming part of Letters Patent No. 732,538, dated June 30, 1903.

Application filed September 4, 1902. Serial No. 122,083. (No model.)

*To all whom it may concern:*

Be it known that I, WILLIAM H. FULCHER, a citizen of the United States, residing at Oakland, county of Alameda, State of California, have invented an Improvement in Dredges; and I hereby declare the following to be a full, clear, and exact description of the same.

My invention relates to improvements in apparatus for dredging and excavating material, and especially where said material is located beneath the surface of water.

It consists of the parts and the constructions and combinations of parts which I will hereinafter describe and claim.

Figure 1:
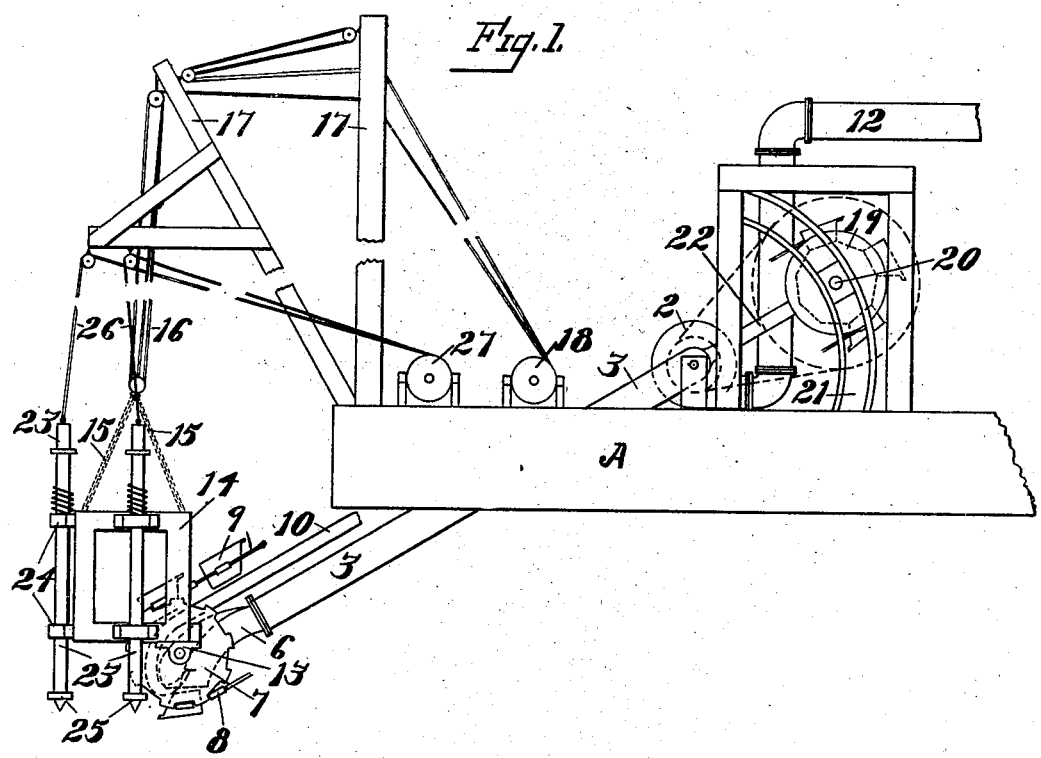
Figure 2:
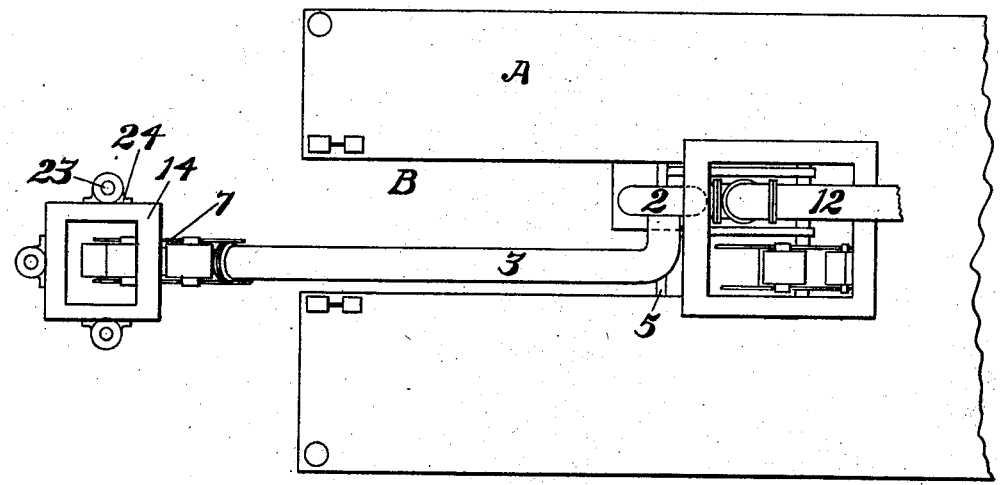

Figure 1 is a side elevation showing the working parts of my apparatus. Fig. 2 is a plan view of the same. Fig. 3 is a side view of the drums and clutches for alternately actuating the disintegrators. Fig. 4 is a side view of the suction-pipe connection with the pump and the pivot-shaft thereof. Fig. 5 is a side view of a series of buckets. Fig. 6 is a plan view of the same. Fig. 7 is an enlarged plan view showing the suction and hydraulic jet-pipe. Fig. 8 is a side view showing the stamps or disintegrators.

As shown in the accompanying drawings, A is a float of any suitable description adapted to carry the apparatus. In the present illustration I have shown the float with an open channel B extending into it from one end, and at the head of this channel, located upon the boat, is a centrifugal suction-pump 2.

3 is a suction-pipe opening centrally into one side of the suction-pump and having a suitable tight turnable joint, as at 4, so that the suction-pipe may be raised or lowered about the axis of the pump without disarranging the connections. Through the elbow by which the pipe is connected with the pump extends a pivot-shaft 5, which is axially in line with the turnable joint of the pump, and these two form the proper support for the part 3 of the pipe, which extends down through the open channel of the float, with a segmental section 6 at the lower end, which is curved downwardly, so as to present the mouth contiguous to the surface of material which is to be excavated. Upon each side of the mouth of this suction-pipe are solid web-disks 7, having grooves upon the periphery adapted to receive the ropes or links of the chains 8, and these ropes serve to carry buckets 9, which are extended transversely between the ropes or chains 8 and are so constructed that the mouths or front ends of the buckets as they travel will scoop up any material which lies in their way.

The diameter of the disks 7 is such that the buckets will pass beneath the mouth of the suction-pipe, and the buckets themselves are made with open-work bottom and sides in the form of a grid, the openings of which are large enough to allow fine material, such as can be taken up by the suction-pipe, to pass through them, but they arrest rocks or large material which cannot be taken up by the suction. Thus by the travel of the buckets all this coarse material is carried up simultaneously with the movement of the finer material which is drawn into the suction-pipe, and this combination of suction and bucket carriers enables me to clear away all the material of whatever character and to greatly increase the amount of work which can be done by the apparatus. In conjunction with this apparatus I have shown a pipe 10 extending approximately parallel with the suction-pipe or extending in suitable relation with the pipe 3 and having the lower end curved and provided with a nozzle which is directed into the suction-pipe and in line therewith, as shown at 11. Water under pressure, either from a high head, when it can be thus supplied, or by the action of a force-pump or other forcing apparatus, is carried through this pipe and discharged through the nozzle into the suction-pipe, thus aiding and assisting the action of the suction-pump and when required serving to reduce the consistency of the material, so that it will flow freely through the conducting-pipes and pump. From the suction-pump the material is delivered through a discharge-pipe 12, leading away from the pump and having any suitable or well-known discharge connections. (Not necessary to be shown in the present case.)

The suction-pipe and the buckets and carriers can all be supported upon a ladder of any usual or suitable construction, fulcrumed on the pivoted shaft 5 and in line with the axis of the pump, and the journal-shaft of the disk 7 is here shown as being turnable in boxes 13 upon a framework 14. This framework is suspended by chains, as at 15, from blocks and ropes, forming a tackle, as at 16, by which the excavating apparatus can be raised or lowered at will. A suitable derrick-frame, as 17, supports and carries the upper blocks of the system, and from these the ropes lead to a winding-drum 18, which may be actuated by suitable power apparatus, (not here shown,) so that whenever required the digging apparatus can be raised or lowered.

Power to drive the endless chain of the buckets may be derived from upper polygonal or sprocket wheels, as 19. These wheels are here shown as journaled in boxes 20, which are guided and adapted to move within segmental guides, as 21. The radius of the arc of these guides is a line from the center and pivot-shaft of the pump 2, with which connections are made by timbers, as at 22, so that as the suction-pipe and chain of buckets are raised or lowered they turn about the axis of the pump 2 as a center, and the timbers 22 extending beyond and connecting with the boxes 20 the latter are moved in the guiding-arc 21, so that the chain of buckets will not be disarranged by these movements.

Power to drive the buckets is derived from the pulley sprocket-wheel or other driver mounted upon the shaft of the driving-wheels 19, and to which driver power may be transmitted through driving chains, belts, or gearing from an engine or source of power not here illustrated.

The driver 19 is here shown of polygonal form, and the surfaces of the buckets fit these sides, so that the driver propels the buckets and through them the cables. The buckets have grips 9ª projecting from the sides and secured to the cables. The disks around which the ropes pass have notches in their grooved peripheries, into which the grips fit as they pass around the disks and by which they are driven in unison.

In order to disintegrate and break away hard material, such as compacted clay or cemented gravel and like hard material, I have shown a series of vertically-movable disintegrators, which consist of stems 23, movable in guides, as 24, upon the framework 14. The lower ends of these slidable shafts or timbers 23 are provided with cutters 25, which may be wedge-shaped or pointed or have edges formed upon them, according to the character of the material to be dislodged. From the upper ends of these timbers 23 ropes or chains 26 pass over suitable pulleys, supported by the framework 17, and thence extend to drums 27 on the float A. Power may be transmitted to rotate these drums in pairs by means of a centrally-located sprocket-wheel 28, mounted upon the journal-shaft and carrying upon each side one member of a clutch, as 29. The other member of each clutch, as 30, is carried by or turnable with one of the drums 27. The members 29 of the clutches are slidable upon feathers on the shaft of the sprocket-wheel 28 and have levers 31, by which they may be moved into or out of engagement with the members 30 of the drums. These levers 31 are actuated alternately by a cam 32, turnable with the sprocket-wheel and so constructed that it will alternately engage and disengage the clutches upon opposite sides. Thus when by its revolution it has engaged the members of the clutches upon one side the drum upon that side will be revolved and through the connecting-ropes will lift the disintegrator or stamper 23 until the clutch has been disengaged by the revolution of the cam. This will allow the stamp to drop and strike the material beneath with a force commensurate with its momentum. These stampers or disintegrators are carried by a frame 14, and being located around the mouth of the suction-pipe and the point where the chain of buckets arrive at the lowest point it will be seen that the material broken off or disintegrated by these constantly-falling stamps will be delivered inwardly and between the solid web-disks of the chain of buckets. Being thus inclosed, the finer portions will be immediately taken up by the suction-pipe, and with the aid of the injector and the pump will be rapidly carried upward to any desired point of delivery.

The larger material, which cannot pass into the suction-pipe, will be constantly removed by the chain of buckets and in the same manner delivered above the surface at any desired point.

It will be understood that the buckets may discharge at the upper end upon suitable endless carriers or into chutes or receivers, as may be desired.

In order to prevent the coarser material being drawn up between the buckets by the suction-pipe, I have shown open-work frames similar in construction to the buckets and connected with the ropes or chains between adjacent buckets so as to approximately fill this space. The connection with the ropes is such that the plates are about even with the tops of the buckets as they pass around the lower drum and below the suction-pipe, and they form with the buckets a grid or network with meshes of sufficient size to allow all material to pass which can be received by the pipe, while the coarser material will be retained and removed by the buckets. These plates also assist to discharge the material when the buckets are inverted in passing over the upper drum. Cushions 32 are interposed to prevent the stamp-stem from striking the frame if the stamps drop too low.

Having thus described my invention, what I claim, and desire to secure by Letters Patent, is—

1. The combination in a dredger of a suction apparatus and a chain of buckets traveling proximate to the inlet of said apparatus said buckets having open-work grids to allow the finer material to enter the suction-pipe and to arrest the coarse material.

2. The combination in a dredging apparatus of a suction-pump, a pipe connected therewith having a mouth or inlet contiguous to the material to be withdrawn, an endless chain of buckets movable with relation to the mouth of the suction-pipe and adapted to convey away the coarser material said buckets provided with open-work grids to allow the finer material to enter the suction-pipe and to arrest the coarse material.

3. The combination in a dredging apparatus of a suction-pump and a pipe connected therewith and having its inlet contiguous to the material to be withdrawn, and a chain of buckets said buckets provided with open-work grids to allow the finer material to enter the suction-pipe and to arrest the coarse material.

4. The combination in a dredger of a suction pump and pipe having its mouth located contiguous to the material to be withdrawn, a hydraulic injector, the nozzle of which discharges into the suction-pipe to operate in unison with the pump, and a chain of buckets movable around carriers located adjacent to the mouth of the suction-pipe.

5. The combination in a dredger of a suction-pump and a pipe having its mouth located contiguous to the material to be withdrawn, carrier-wheels consisting of solid web-disks located upon each side, and inclosing the mouth of the pipe, endless ropes or chains passing around said carriers and buckets carried by said ropes adapted to operate in unison with the suction apparatus.

6. The combination in a dredger of a suction-pump, a pipe therefor having its mouth located contiguous to the material to be withdrawn, an endless chain of buckets movable adjacent to the mouth of the suction-pipe, said buckets being formed with openings whereby the coarser material is retained and carried by the buckets, and the finer material escapes to be taken up by the suction-pipe.

7. The combination in a dredge of an endless chain of open-work buckets with carrier-wheels and drivers around which the buckets pass, the carriers at the lower end being in the form of closed or solid web-disks, a suction-pump, the pipe of which has its mouth opening between and inclosed by said disks and a hydraulic injector discharging into the suction-pipe.

8. The combination in a dredge of an excavating apparatus, a dredge upon which the upper end thereof is carried and about which the lower end is movable, means for raising and lowering said lower end, disintegrating-stamps located contiguous to the excavating portion, and means for raising and dropping said stamps, said means consisting of hoisting-ropes, drums about which they are wound, means for engaging and disengaging the drums with the driver, consisting of clutches and mechanism by which the clutches are actuated to alternately engage and disengage.

9. The combination in a dredge of a float, a suction-pump carried thereon, a suction-pipe connected with the pump having its inlet-mouth located contiguous to the material to be excavated, an endless chain of buckets, sprocket-wheels journaled upon each side of the suction-pipe inlet about which the lower ends of the chains or cables pass, drivers or sprockets about which the upper ends of the chains pass, segmental guides in which the journal-boxes of the driving-wheels are slidable, said guides having a curvature concentric with the axis of the suction-pump.

10. The combination in a dredger of a suction-pipe, a chain of buckets, carrier-wheels therefor at each side of the lower end of the pipe, a suction-pump with which the upper end of the pipe is connected, a ladder upon which the excavating devices are carried, said ladder being turnable about the pump-axis and having extensions rearwardly therefrom, and a driver for the chain of buckets located upon said extension.

11. The combination in a dredger of a suction-pipe and an endless chain of buckets operating in unison, a ladder upon which said excavators are carried, a suction-pump, journals in line with its axis about which the ladder is turnable, an extension of the ladder rearwardly from the pump, a driver for the chain of buckets mounted upon said extension, and segmental guides in which the journal-boxes of the driver are movable.

12. The combination in a dredger of a suction-pipe and an endless chain of buckets operating in unison, said buckets movable beneath the suction-pipe and being formed with open-work meshes to allow the finer material to enter the suction-pipe and to arrest the coarse material.

13. The combination in a dredger of a suction-pipe and an endless chain of buckets operating in unison and with relation to each other as shown, and open-work grids extending between the buckets.

14. The combination in a dredger of a suction-pipe and an endless chain of buckets adapted to pass between the mouth of the suction-pipe and the material to be excavated, said buckets being formed with open meshes, and open grids extending between the buckets and movable in unison therewith whereby the coarser material is separated from the finer and prevented from entering the pipe.

15. In a dredger, an endless chain of buckets, cables passing around grooved disks at each side at the upper and lower ends, grips projecting from the sides of the buckets to connect them with the cables, and a polygonal driver having surfaces which register with the contacting bucket-surfaces, whereby power is transmitted to drive the bucket-chain.

16. In a dredger, an endless chain of buckets, cables passing around grooved disks at each side and the upper and lower ends, grips projecting from the sides of the buckets and connecting them with the cables, notches in the peripheries of the disks into which the grips fit as they pass, and a polygonal driver upon which the surfaces of the buckets register and through which power is transmitted.

In witness whereof I have hereunto set my hand.

WILLIAM H. FULCHER.

Witnesses:
S. H. NOURSE,
JESSIE C. BRODIE.